Sept. 21, 1954     J. R. GRETZINGER     2,689,652
OIL FILTER
Filed Nov. 4, 1950
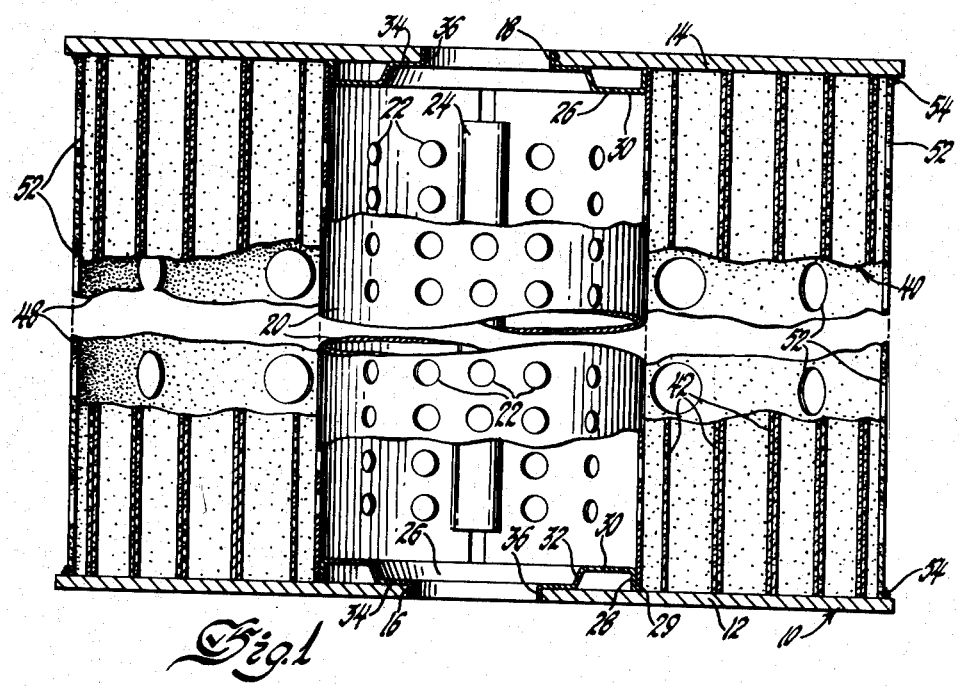
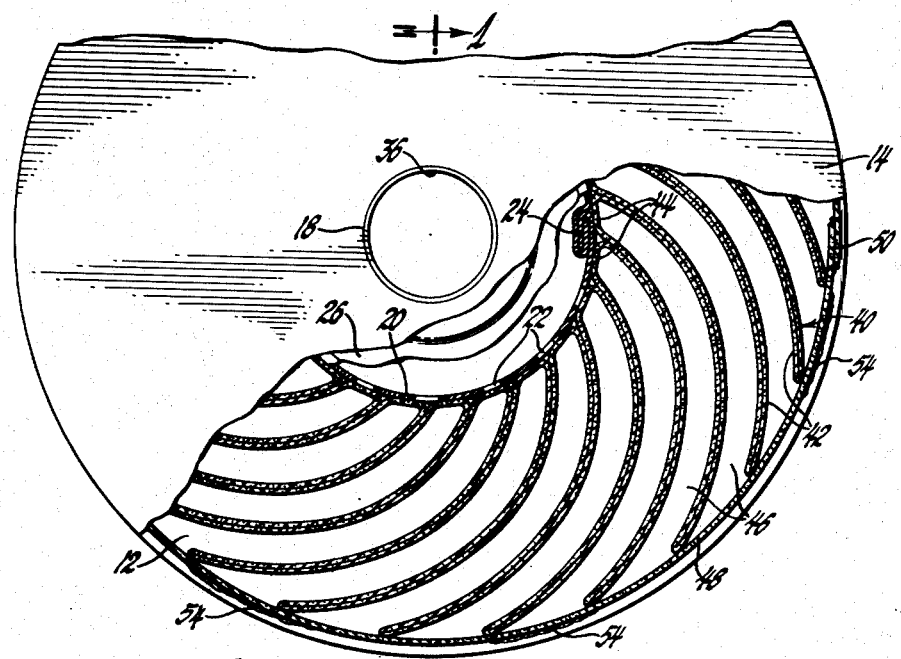
Inventor
John R. Gretzinger
By
Willits, Helmig & Baillio
Attorneys Patented Sept. 21, 1954

2,689,652

UNITED STATES PATENT OFFICE 2,689,652

OIL FILTER

John R. Gretzinger, Flint, Mich., assignor to General Motors Corporation, Detroit, Mich., a corporation of Delaware Application November 4, 1950, Serial No. 194,165

7 Claims. (Cl. 210—169)

This invention relates to filters and more particularly to an improved high capacity oil filter for automotive use.

The invention is illustrated in connection with an oil filter element of the cylindrical type. Since oil filter elements having a generally cylindrical shape with a passage through the center are widely used in the automotive field, it is not believed necessary to illustrate the conventional housing. The elements are positioned in cylindrical oil filter housings having an axially located outlet pipe extending through the housing and an inlet pipe secured to a wall of the housing. The cylindrical oil filter element is positioned on the centrally located outlet pipe within the housing. The upper and lower plates of the filter element engage the outlet pipe in sealed relationship so that the unfiltered oil after passing through the filter enters the portion of the outlet pipe through suitable apertures within the filter and flows to the engine. This improved filter consists essentially of a pair of circular end plates which support and seal the filter material located in an annular region between the end plates. A cylindrical tube is centrally located between and secured to the end plates to support the end plates and the filter element. The filter element consisting of a long strip of foraminous material is folded to form a plurality of pleats extending from the central tube to the outer perimeter of the end plates. The inner surfaces of the paper in each of the pleats are in contact but the paper has sufficient roughness to maintain a space to allow drainage of the filtered fluid. The outside faces of the pleats are substantially uniformly spaced a sufficient distance to provide uniform sludge pockets. The inner portion of the foraminous filter material lies against the central tube. It will be seen that if each of the pleats has a generally spiral shape that the space between the pleats may be made substantially uniform. However, in the preferred form of the invention, the pleats are formed on a true involute arc to provide uniform spacing between the pleats.

A primary object of the invention is to provide in a filter having a high surface area for small unit volume a plurality of uniformly spaced filtered walls to provide uniform sludge pockets.

Another object of the invention is to provide an improved filter unit in which a filter has a plurality of double wall filter pleats extending spirally in relation to each other to provide a substantially uniform space between the pleats for a sludge pocket having a uniform width.

A further object of the invention is to provide in a filter element positioned between the pair of end plates supported by a central tube, a plurality of double wall filter pleats extending from the central tube to the outer periphery of the end plates in an involute curve to provide equal spacing between adjacent double wall pleats.

It is believed that these and further objects and advantages of the invention and the manner in which they are achieved will be more fully apparent from the appended description of the preferred embodiment of the invention and the accompanying drawing.

Figure 1 shows a partial cross-sectional view on the line 1—1 of Figure 2 of the filter element with parts broken away and in section to show details of the invention.

Figure 2 is a partial plan view of the filter element with parts broken away and in section to show the involute pleats.

The invention is illustrated in a cylindrical type filter element 10 having circular end plates 12 and 14 which have central apertures 16 and 18 respectively. The central apertures 16 and 18 provide a passage through the center of the filter element 10. These cylindrical type filter units are employed in generally cylindrical filter housings having axially located outlet pipes extending from the base of the filter housing to the removable top of the filter housing. These outlet pipes are closed in the upper end and provided with suitable outlet apertures intermediate their length which will be located within the filter element when it is positioned within the filter housing. When the present filter is used in a housing the outlet pipe extends through apertures 16 and 18. The inlet pipe is secured to the housing around an aperture, so that unfiltered oil entering through the inlet pipe fills the housing and surrounds the filter element.

The lower filter plate 12 and the upper filter plate 14 are supported in spaced relation by a centrally located support tube 20 which is made of foraminous material or sheet material having suitable apertures 22 to allow the filtered fluid to flow into the central passage of the filter element 10. The support tube 20 may have a cylindrical shape and a rolled seam 24 as illustrated in Figure 2 and is connected to the end plates 12 and 14 by identical attaching members 26. The attaching members 26 have an axially directed cylindrical flange 28 which fits within and is secured, for example welded, to the support tube 20. The axially directed flange 28 may have a rolled portion or lip 29 fitting over the end of the support tube 20. The attaching members 26 then have a flat annular portion 30 which is spaced from the end plate and a substantially axially extending flange 32 extending to the end plate. The attaching members 26 then have a flat annular portion 34 contacting the inner face of the end plate about the periphery of the apertures 16 and 18. In order to positively locate the end plates on the attaching members 26, an axially extending cylindrical flange 36 projects within the apertures 16 and 18.

The filter material is a strip of foraminous material, preferably a strip of resin impregnated filter paper. The filter strip 40 is endless or sealed together at its ends and is folded to form a plurality of double wall filter pleats 42. These pleats extend from the support tube 20 to the outer periphery of the end plates 12 and 14. The inner walls of each of the parts in the double wall pleats 42 are in contact with each other but the paper has sufficient texture or roughness to provide passages so that the filtered fluid may drain from the outer portions of the pleats to the inner portions and through the apertures 22 and the support tube 20. At the center of the filter element the filter strip 40 has a connecting or spacing portion 44 in contact for a short distance with the support tube 20 to provide a sludge pocket between adjacent filter pleats 42. Then the filter strip is folded outwardly to provide another double wall filter pleat 42. The double wall filter pleats are folded in an essentially involute form to provide a substantially uniform sludge pocket 46 between the pleats 42. It is preferred to make the sludge pocket 46 between the pleats 42 of absolute uniform width. This may be accomplished by accurately forming the curvature of the pleats 42 to a true involute curve. This structure will provide uniform space for the sludge layer to form and will eliminate premature clogging of some portions of the filter surface. However, since it may be difficult or expensive to manufacture filters with true involute pleats, it will be appreciated that some generally spiral curves approximating the involute curve will substantially provide the advantages of the invention.

The strip of filter material is secured at its lower and upper edges to the plates 12 and 14 respectively by suitable adhesive or resin bonding materials. This seal extends throughout the complete length of both walls of each pleat 42 and the connecting wall portions 44 adjacent the central support tube 20. It is also possible that the edges of the filter strip at the center may be secured at the end plates through the short connecting wall portion 44 and that the double walls of the pleats 42 may be merely secured to each other. The filter element is protected by a heavy cardboard or sheet metal protector strip 48 wrapped around the cylindrical filter element and secured together by a seam 50. A protector strip 48 has suitable apertures 52 to allow fluid to flow into the filter and may be suitably secured by adhesive material 54 to the end plates.

This filter element is designed to be employed in a conventional filter housing. The filter housing has an oil inlet which permits the oil to surround the filter element 10. The oil will pass through the apertures 52 in the protector strip 48 and enter each of the spaces 46 between the filter pleats 42. The unfiltered oil will be in contact with the entire filter surface. Since all the passages or spaces 46 between the filter surfaces are of uniform width, there will be no tendency to build up sludge formations which may block the flow of oil to other portions of the filter unit. Thus the filter element will have a long period of life at its full-rated capacity. The unfiltered oil then passes through the layers of foraminous filter material into the space between the double wall pleats 42. Since the filter material has sufficient roughness to main a slight separation of the double wall pleats 42, a drain passage is provided between the walls to allow the filtered oil to drain toward the center of the filter unit and pass through the apertures 22 of the support tube 20. There the oil accumulates in the central cavity within the support tube 20 which is closed at each end by the drain tube of the conventional filter housing extending through the end apertures 16 and 18 and sealed to the plates 12 and 14 of filter unit 10. Since the drain tubes generally have the outlet apertures at the center or near the top of the filter unit, a pool of oil will accumulate in the filter until it reaches the level of the outlet aperture in the drain pipe. A filter unit may be assembled by arranging a strip of previously pleated filter material around the central support tube with the pleats extending in generally radial direction beyond the outer periphery of the end plates. The pleats may then be folded to a spiral type or involute form by the use of guides or spacers to position the pleats. The pleats may also be curved to the spiral or involute form by wrapping a cylindrical protector strip around the filter pleats in their radial position extending beyond the edge of the end plates and contracting the cylindrical protector strip and rotating it to bend the pleats into the spiral or involute form.

The detailed description herein of a preferred embodiment of the invention is not to be considered limiting the invention since many modifications will occur to those skilled in the art within the scope of the invention as defined in the appended claims.

I claim:

1. In a filter, a pair of end plates with central apertures, a support tube having a passage leading through the wall thereof, the ends of said tube communicating with at least one of said apertures, means securing said tube to said end plates, an endless filter strip of sheet material folded transversely to form a plurality of outwardly extending pleats and spacing portions arranged alternately therewith, each of said spacing portions having a substantial widthwise area contact with the outside surface of said tube, the opposing inner surfaces of the sheet material in each of said pleats being contiguous throughout their areas, the opposed outer walls of adjacent pleats being spaced at all points from each other, and each of said pleats being in the form of approximately an involute curve to provide said spacing.

2. In a filter, a strip of filter material consisting of a plurality of double wall filter pleats of uniform thickness and intermediate connecting and spacing portions, means to support said strip of filter material and to seal the edges of said strip of filter material, each of said filter pleats having inner walls in substantial interfacial contact, the adjacent outer walls of said pleats being uniformly spaced from each other substantially throughout their entire length and width a distance substantially greater than the thickness of said filter strip, and each of said double wall filter pleats being curved in substantially involute pleat form.

3. In a filter, a pair of end plates, means to support the end plates in spaced relation, an endless filter strip having longitudinal edges and folded transversely to form a plurality of outwardly extending double wall filter pleats of uniform thickness and spacing portions therebetween, said spacing portions having extended longitudinal area contact with said support means, said outwardly extending double wall filter pleats being folded in substantially involute curves to provide sludge pockets between the pleats, two of said filter pleats defining each sludge pocket being entirely spaced from each other to form an unrestricted sludge pocket adjacent the full area of said two pleats, and means to seal said longitudinal edges to said end plates.

4. In a filter, a pair of end plates, an apertured support tube centrally located between said end plates, said end plates having apertures in communication with said support tube, attaching means to secure said support tube to each of said end plates, an endless filter strip folded transversely to form a plurality of outwardly extending double wall filter pleats of uniform thickness and spacing portions therebetween, said spacing portions having extended longitudinal area contact with said support tube, said filter pleats having inner walls in substantial interfacial contact, the outerwalls of adjacent pleats being spaced from each other substantially throughout their length and width, said outwardly extending double wall filter pleats each having the form of an involute curve to provide uniform spacing between the pleats.

5. In a filter, a pair of end plates, a support tube having an outlet aperture, said support tube being centrally located and connecting said end plates, apertures in said end plates in alignment with said support tube, a pair of attaching members each having a flange secured to one of the opposite ends of said support tube and another flange secured to one of said end plates, an endless filter strip folded to form a plurality of outwardly extending double wall filter pleats of uniform thickness and spacing portions therebetween, said spacing portions having areas contacting said support tube, said double wall filter pleats having inner surfaces in substantial area contact, the outer surfaces of adjacent pleats being spaced at all points a substantial distance from each other to provide an unrestricted passage and space for sludge, and each of said outwardly extending double wall filter pleats forming a spiral curve to provide substantially uniform spacing between the pleats.

6. In a filter, a support, a continuous strip of resin impregnated filter paper encircling said support and having an outside surface for contact with unfiltered liquid and an inside surface in contact with filtered liquid, said strip being folded to form a plurality of curved pleats and alternate spacing portions, each pleat extending from the said support to the outer portion of the filter and having the opposed portions of the inside surface of the filter strip in contact with each other over the entire area of the pleat, each adjacent pair of pleats having the opposed portions of the outer surface of the filter strip substantially spaced from each other over the entire area of the pleats a distance determined by the width of one of said spacing portions to form a sludge pocket, and means to seal both entire longitudinal edges of said filter strip to separate said inside surface contacted by the filtered liquid from said outside surface contacted by the unfiltered liquid.

7. In a filter, a continuous strip of resin impregnated filter paper having an outside surface for contact with unfiltered liquid and an inside surface for contact with filtered liquid, said strip being transversely folded to form a plurality of pleats and alternate spacing portions of substantial width between each pair of side portions forming a pleat, said alternate spacing portions being positioned in a substantially continuously cylindrical form, each of said pleats consisting of two side portions, each side portion of each pleat being connected to an adjacent alternate portion at its inner end and extending from said alternate portion outwardly in a substantially involute curve to the outer portion of the filter, each of said pleats having the inside surfaces of the opposed side portions of the filter strip in contact with each other over the entire area of the pleat, each adjacent pair of pleats having the outer surfaces of the opposed side portions of the filter strip completely free of surface contact and substantially spaced a uniform distance from each other over the entire area from the inner edge to the outer edge of each pleat to form a sludge pocket having a width substantially equal to the width of an alternate spacing portion, and means to seal the entire longitudinal edges of said filter strip to separate said inside and outside surfaces of said strip of filter material.

References Cited in the file of this patent

UNITED STATES PATENTS

| Number | Name | Date |
|---|---|---|
| 2,239,868 | Williams | Apr. 29, 1941 |
| 2,395,449 | Briggs | Feb. 26, 1946 |
| 2,420,414 | Briggs | May 13, 1947 |
| 2,468,862 | Briggs | May 3, 1949 |